(12) United States Patent
Sugiura et al.

(10) Patent No.: US 12,473,424 B2
(45) Date of Patent: Nov. 18, 2025

(54) FILM AND ELECTRODE

(71) Applicant: Murata Manufacturing Co., Ltd., Nagaokakyo (JP)

(72) Inventors: Kosuke Sugiura, Nagaokakyo (JP); Mika Fujiwaki, Nagaokakyo (JP); Toshiko Shimazaki, Nagaokakyo (JP); Takeshi Torita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/944,966

(22) Filed: Nov. 12, 2024

(65) Prior Publication Data

US 2025/0122360 A1    Apr. 17, 2025

Related U.S. Application Data

(63) Continuation of application No. PCT/JP2023/008383, filed on Mar. 6, 2023.

(30) Foreign Application Priority Data

May 18, 2022   (JP) ................................ 2022-081565

(51) Int. Cl.
*H01B 1/20* (2006.01)
*A61B 5/268* (2021.01)
(Continued)

(52) U.S. Cl.
CPC ................ *C08K 9/02* (2013.01); *A61B 5/268* (2021.01); *C08J 5/18* (2013.01); *H01B 1/20* (2013.01);
(Continued)

(58) Field of Classification Search
CPC ............ H01B 1/00; H01B 1/124; H01B 1/20; H01M 4/02; H01M 4/13; H01M 4/46; H01G 11/38
See application file for complete search history.

(56) References Cited

U.S. PATENT DOCUMENTS

| 12,046,389 B2 | 7/2024 | Abe et al. |
| 12,080,444 B2 | 9/2024 | Morita et al. |

(Continued)

FOREIGN PATENT DOCUMENTS

| CN | 112300363 A | 2/2021 |
| KR | 102377769 B1 * | 3/2022 |

(Continued)

OTHER PUBLICATIONS

Wustoni et al "MXene improves the stability and electrochemical performance of electropolymerized PEDOT films", APL Mater. 8, 121105 (2020); doi: 10.1063/5.0023187.*

(Continued)

*Primary Examiner* — Mark Kopec
(74) *Attorney, Agent, or Firm* — ArentFox Schiff LLP (57) ABSTRACT

A film including: particles of a two-dimensional material containing one or plural layers, wherein the one or plural layers comprise a layer body represented by: $M_mX_n$, wherein M is at least one metal of Group 3, 4, 5, 6, or 7, X is a carbon or nitrogen atom, or a combination thereof, n is 1 to 4, and m is more than n but not more than 5, and a modifier or terminal T exists on a surface of the layer body, wherein T is at least one selected from a hydroxyl group, a fluorine atom, a chlorine atom, an oxygen atom, and a hydrogen atom; and a polymer having an anionic functional group and a cationic functional group, wherein a ratio of the polymer to a sum of the particles of the two-dimensional material and the polymer in the film is 5 vol % to 70 vol %.

17 Claims, 2 Drawing Sheets

(51) Int. Cl.
  *C08J 5/18* (2006.01)
  *C08K 9/02* (2006.01)
  *H01M 4/46* (2006.01)
  *A61N 1/04* (2006.01)

(52) U.S. Cl.
  CPC ............... *H01M 4/46* (2013.01); *A61N 1/04* (2013.01); *C08J 2333/10* (2013.01); *C08J 2333/14* (2013.01); *C08K 2201/001* (2013.01)

(56) References Cited

U.S. PATENT DOCUMENTS

| | | |
|---|---|---|
| 2023/0154642 A1 | 5/2023 | Morita et al. |
| 2023/0187098 A1 | 6/2023 | Abe et al. |
| 2024/0194888 A1* | 6/2024 | Laicer ............... H01M 4/628 |
| 2024/0379260 A1 | 11/2024 | Morita et al. |

FOREIGN PATENT DOCUMENTS

| | | |
|---|---|---|
| WO | 2022/030444 A1 | 2/2022 |
| WO | 2022/050317 A1 | 3/2022 |

OTHER PUBLICATIONS

Higgins "Conjugated polymers incorporating pendant functional groups-synthesis and characterisation", Chemical Society Reviews, 1997, vol. 26 pp. 247-257.*
Alhabeb et al "Guidelines for Synthesis and Processing of Two-Dimensional Titanium Carbide (Ti3C2Tx MXene)", Chem. Mater. 2017, 29, 7633-7644.*
PCT/ISA/210 English translation (mailed May 2023).*
PCT/ISA/237 English translation (mailed May 2023).*
International Search Report received for PCT Patent Application No. PCT/JP2023/008383, mailed on May 16, 2023, 2 pages (English Translation Only).

* cited by examiner

Fig.1

FILM AND ELECTRODE

CROSS REFERENCE TO RELATED APPLICATIONS

The present application is a continuation of International application No. PCT/JP2023/008383, filed Mar. 6, 2023, which claims priority to Japanese Patent Application No. 2022-081565, filed May 18, 2022, the entire contents of each of which are incorporated herein by reference.

TECHNICAL FIELD

The present disclosure relates to a film and an electrode using the film.

BACKGROUND ART

In recent years, MXene has been attracting attention as a new material having conductivity. MXene is a type of so-called two-dimensional material, and more specifically, as will be described later, MXene is a two-dimensional material (layered material) in the form of one or plural layers. In general, MXene is in the form of particles (which may include powders, flakes, nanosheets, and the like) of such a two-dimensional material (layered material).

In the related art, a composite material of MXene and a polymer has been known. For example, Patent Document 1 describes that a mixed liquid containing MXene and polyisocyanate and a mixed liquid containing another material (other MXene, graphene, carbon nanotube, oxide particles, and the like) and polyether are reacted in a mold by applying the polyurethane foaming principle to obtain a MXene composite foam in which MXene and the other material are composited in foamed polyurethane.

Patent Document 1: Chinese Patent Application Publication No. 112300363

SUMMARY OF THE DISCLOSURE

A film containing MXene and a polymer can exhibit conductivity, and it has been studied to use such a conductive film as an electrode). An electrode, for example, a biosignal sensing electrode, is required to have sufficient strength and impedance as low as possible. However, the MXene composite foam described in Patent Document 1 has a disadvantage of low strength. Further, Patent Document 1 does not mention the impedance of the MXene composite foam.

An object of the present disclosure is to provide a novel film containing MXene and a polymer and having high strength and low impedance. A further object of the present disclosure is to provide an electrode using such a film.

According to one aspect of the present disclosure, there is provided a film comprising: particles of a two-dimensional material containing one or plural layers, wherein the one or plural layers include a layer body represented by:

wherein M is at least one metal of Group 3, 4, 5, 6, or 7, X is a carbon atom, a nitrogen atom, or a combination thereof, n is not less than 1 and not more than 4, and m is more than n but not more than 5; and a modifier or terminal T exists on a surface of the layer body, wherein T is at least one selected from a hydroxyl group, a fluorine atom, a chlorine atom, an oxygen atom, and a hydrogen atom; and a polymer having an anionic functional group and a cationic functional group, wherein a ratio of the polymer to a sum of the particles of the two-dimensional material and the polymer in the film is 5 vol % to 70 vol %.

According to another aspect of the present disclosure, there is provided an electrode including the film.

The present disclosure provides a novel film containing particles of a predetermined two-dimensional material (also referred to herein as "MXene") and a polymer, wherein the film has high strength and low impedance. Furthermore, the present disclosure provides an electrode using such a film.

BRIEF DESCRIPTION OF THE DRAWINGS

FIGS. 2(*a*) and 2(*b*) are schematic sectional views illustrating two-dimensional material (MXene) particles which are usable in one embodiment of the present disclosure, in which FIG. 2(*a*) illustrates single-layer MXene particles, and FIG. 2(*b*) illustrates multilayer (exemplarily two-layered) MXene particles.

DETAILED DESCRIPTION OF THE PREFERRED EMBODIMENTS

Hereinafter, a film (more specifically, a conductive film) in one embodiment of the present disclosure will be described in detail, but the present disclosure is not limited to such an embodiment.

Figure 1:
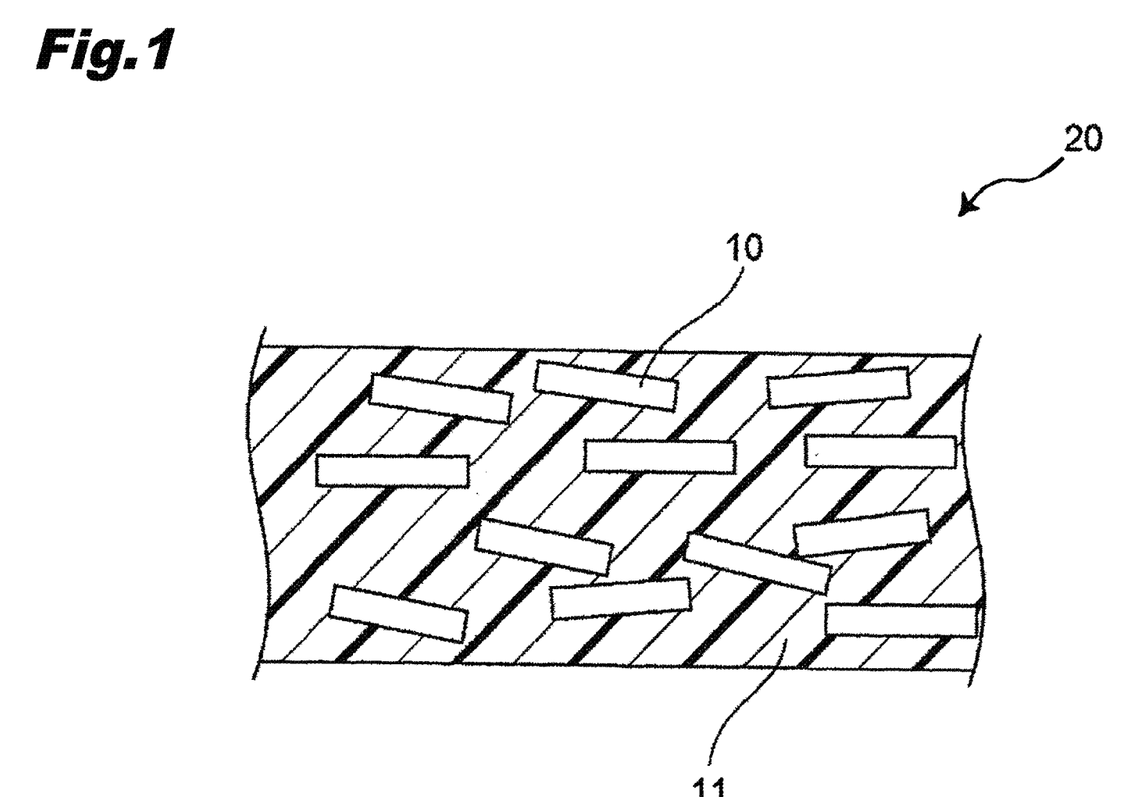
FIG. 1 is a schematic cross-sectional view illustrating a film in one embodiment of the present disclosure.

Referring to FIG. 1, a film 20 of the present embodiment includes particles 10 of a predetermined two-dimensional material (layered material) and a polymer (hereinafter, also referred to as "amphoteric polymer" in the present disclosure) 11 having an anionic functional group and a cationic functional group, and in the film 20, a ratio of the amphoteric polymer 11 to the total of the particles 10 of the predetermined two-dimensional material and the amphoteric polymer 11 is 5 vol % to 70 vol %. By using the amphoteric polymer 11 in combination with the particles 10 of a predetermined two-dimensional material (layered material), the film 20 having high strength and low impedance can be realized.

Hereinafter, the film 20 of the present embodiment will be described in detail through the producing method thereof. Unless otherwise specified, the description in the method for producing the film may also apply to the film itself.

A method for producing a film of the present embodiment includes:

(a) preparing a liquid composition containing particles of a predetermined two-dimensional material (layered material), a polymer having an anionic functional group and a cationic functional group, and a liquid medium; and (b) forming a precursor film on a substrate using the liquid composition, and at least drying the precursor structure to obtain a composite material structure.

Step (a)

<MXene Particles>

First, particles of a predetermined two-dimensional material (layered material) are prepared. The predetermined two-dimensional material that can be used in present embodiment is MXene and is defined as follows:

a two-dimensional material (layered material) (this can be understood as a layered compound, also represented as "$M_mX_nT_s$", where s is any number and traditionally x is sometimes used instead of s) containing one or plural layers, the one or plural layers including a layer body (the layer body may have a crystal lattice in which each X is located in an octahedral array of M) represented by a formula below:

$$M_mX_n$$

(wherein M is at least one metal of Group 3, 4, 5, 6, or 7 and may contain at least one selected from the group consisting of so-called early transition metals such as Sc, Ti, Zr, Hf, V, Nb, Ta, Cr, Mo, and Mn, X is a carbon atom, a nitrogen atom, or a combination thereof, n is 1 to 4, and m is more than n and 5 or less) and a modifier or terminal T (T is at least one selected from the group consisting of a hydroxyl group, a fluorine atom, a chlorine atom, an oxygen atom, and a hydrogen atom) that presents on the surface (more specifically, at least one of the two opposing surfaces of the layer body) of the layer body. Typically, n can be 1, 2, 3, or 4, but is not limited thereto.

In the above formula of MXene, M is preferably at least one selected from the group consisting of Ti, Zr, Hf, V, Nb, Ta, Cr, Mo, and Mn, and more preferably at least one selected from the group consisting of Ti, V, Cr, and Mo.

MXenes whose above formula $M_mX_n$ is expressed as below are known:

$Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti, V)_2C$, $(Ti, Nb)_2C$, $W_2C$, $W_{1.3}C$, $Mo_2N$, $Nb_{1.3}C$, $Mo_{1.3}Y_{0.6}C$ (In the above formula, "1.3" and "0.6" mean about 1.3 (=4/3) and about 0.6 (=2/3), respectively.), $Tis C_2$, $TisN_2$, $Ti_3(CN)$, $Zr_3C_2$, $(Ti, V)_3C_2$, $(Ti_2Nb)C_2$, $(Ti_2Ta)C_2$, $(Ti_2Mn)C_2$, $Hf_3C_2$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$, $Ti_4N_3$, $V_4C_3$, $Nb_4C_3$, $Ta_4C_3$, $(Ti, Nb)_4C_3$, $(Nb, Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, $(W_2Hf_2)C_3$, $(Mo_{2.7}V_{1.3})C_3$ (In the above formula, "2.7" and "1.3" mean about 2.7 (=8/3) and about 1.3 (=4/3), respectively.).

Typically, the $M_mX_n$ is be represented by at least one selected from the group consisting of $Ti_2C$, $Ti_3C_2$, $Ti_3(CN)$, $(Cr_2Ti)C_2$, $(Mo_2Ti)C_2$, $(Mo_2Ti_2)C_3$, and $(Mo_{2.7}V_{1.3})C_3$.

In particular, $M_mX_n$ may be $Ti_3C_2$.

Such MXene particles (hereinafter, the particles are simply referred to as "MXene particles") can be synthesized by selectively etching (removing and optionally layer-separating) A atoms (and optionally a part of M atoms) from a MAX phase which is a raw material.

In other words, the method for producing the film of the present embodiment may further include a step of obtaining MXene particles before the step (a), and the step of obtaining MXene particles includes etching the MAX phase as a raw material with an etching solution (etching treatment).

The MAX phase which is a raw material (hereinafter, also simply referred to as "MAX raw material") is represented by the formula below: $M_mAX_n$ Wherein M, X, n, and m are as described above, A is at least one element of Group 12, 13, 14, 15, or 16, normally an element of Group A, typically of Group IIIA and Group IVA, more specifically can include at least one selected from the group consisting of Al, Ga, In, Tl, Si, Ge, Sn, Pb, P, As, S, and Cd, and is preferably Al. The MAX phase has a crystal structure in which a layer formed of A atoms is located between two layers represented by $M_mX_n$ (each X may have a crystal lattice located in an octahedral array of M). When typically m=n+1, but not limited thereto, the MAX phase includes repeating units in which each one layer of X atoms is disposed in between adjacent layers of n+1 layers of M atoms (these are also collectively referred to as an "$M_mX_n$ layer"), and a layer of A atoms ("A atom layer") is disposed as a layer next to the (n+1)th layer of M atoms. The A atom layer (and optionally a part of the M atoms) is removed by selectively etching (removing and optionally layer-separating) the A atoms (and optionally a part of the M atoms) from the MAX phase. The surface of the exposed $M_mX_n$ layer is modified by hydroxyl groups, fluorine atoms, chlorine atoms, oxygen atoms, hydrogen atoms, and the like, existing in an etching solution (usually, an aqueous solution of a fluorine-containing acid is used, but not limited thereto), so that the surface is terminated.

The etching solution may contain any suitable acid (HF, HCl, HBr, HI, sulfuric acid, phosphoric acid, nitric acid, and the like).

For example, the MAX raw material may be etched with an etching solution containing hydrofluoric acid. By using hydrofluoric acid for the etching solution, hydrofluoric acid (HF) is present in the etching solution. The etching treatment with an etching solution containing hydrofluoric acid may also be referred to as an ACID method. In addition to hydrofluoric acid, the etching solution may further contain other acids such as hydrochloric acid, hydrobromic acid, hydroiodic acid, nitric acid, sulfuric acid, acetic acid, formic acid, hypochlorous acid, and fluorosulfonic acid.

Alternatively, for example, the MAX raw material may be etched with an etching solution containing fluoride and acid (excluding hydrofluoric acid). By using fluoride and acid (excluding hydrofluoric acid) for the etching solution, hydrofluoric acid (HF) exists in situ in the etching solution. Etching by an etching solution containing fluoride and acid (excluding hydrofluoric acid) may also be referred to as an MILD method. As the fluoride, a metal fluoride, for example, lithium fluoride, sodium fluoride, potassium fluoride, or the like is used, and in particular, lithium fluoride can be used. When the metal fluoride is used, metal (metal ion) can be intercalated into the MXene particles together with the etching of the MAX raw material in the etching treatment. As the acid (excluding hydrofluoric acid), for example, hydrochloric acid, hydrobromic acid, hydroiodic acid, nitric acid, sulfuric acid, acetic acid, formic acid, hypochlorous acid, fluorosulfonic acid, and the like are used, and hydrochloric acid can be particularly used. Ammonium hydrogen difluoride may be used as the fluoride and the acid (excluding hydrofluoric acid).

The step of obtaining the MXene particles may appropriately include any appropriate treatment after the etching treatment. Examples of such treatment include washing, intercalation, delamination, and the like. The washing may apply with any suitable washing medium, for example water, dilute hydrochloric acid, and the like, followed by centrifugation/decantation. The intercalation may intercalate a metal (metal ion) into the MXene particles. The delamination may promote delamination (the multilayer MXene particles are made into MXene particles having a smaller number of layers, for example, single-layer MXene particles) of the MXene particles by applying an impact such as vibration and/or ultrasonic waves. For example, the delamination treatment can be performed for a predetermined time by a handshake, an automatic shaker, a mechanical shaker, a vortex mixer, a homogenizer, an ultrasonic bath, or the like.

It is noted, in the present disclosure, the MXene particle may contain remaining A atoms at a relatively small amount, for example, at 10% by mass or less with respect to the original amount of A atoms. The remaining amount of A atoms can be preferably 8% by mass or less, and more preferably 6% by mass or less. However, even if the residual amount of A atoms exceeds 10% by mass, there may be no problem depending on the application and use conditions of the film.

Figure 2A:
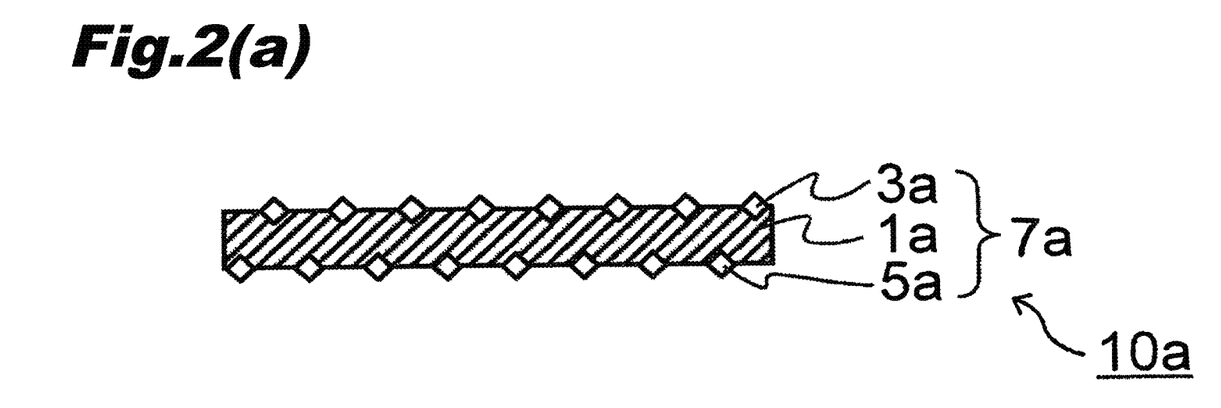
Figure 2B:
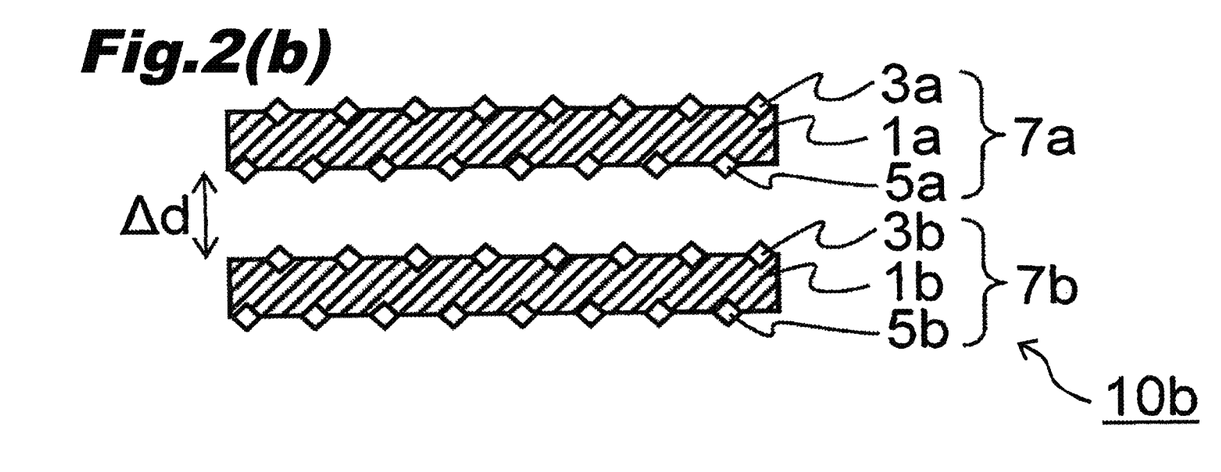

As schematically illustrated in FIG. 2, the MXene particles 10 synthesized in this manner may be particles of a layered material (as examples of the MXene particles 10, the MXene particles 10a in one layer are illustrated in FIG. 2(a), and the MXene particles 10b in two layers are illustrated in FIG. 2(b), but the present disclosure is not limited to these examples) including one or plural MXene layers 7a and 7b. More specifically, the MXene layers 7a, 7b have layer bodies ($M_mX_n$ layers) 1a, 1b represented by $M_mX_n$, and modifiers or terminals T 3a, 5a, 3b, 5b existing on the surfaces of the layer bodies 1a, 1b (more specifically; on at least one of both surfaces, facing each other, of each layer). Therefore, the MXene layers 7a, 7b are also represented by "$M_mX_nT_s$," wherein s is any number. The MXene particles 10 may be: one that exists as one layer obtained by such MXene layers being separated from one another (single-layer structure shown in FIG. 2(a), so-called single-layer MXene 10a): a laminate made of a plurality of MXene layers being stacked to be apart from each other (multilayer structure shown in FIG. 2(b), so-called multilayer MXene particle 10b); or a mixture thereof. The MXene particles 10 can be particles (which can also be referred to as powders or flakes) as a collective entity formed of the single-layer MXene particle 10a and/or the multilayer MXene particle 10b. In the case of multilayer MXene particles, two adjacent MXene layers (for example, 7a and 7b) do not necessarily have to be completely separated from each other, and may be partially in contact with each other.

Although the present embodiment is not limited, the thickness of each layer of MXene (which corresponds to the MXene layers 7a and 7b) is, for example, 0.8 nm to 5 nm, and particularly 0.8 nm to 3 nm (which may mainly vary depending on the number of M atom layers included in each layer), and the maximum dimension (which may correspond to the "in-plane dimension" of the particle) in a plane parallel to the layer (two-dimensional sheet plane) is, for example, 0.1 μm or more, particularly 1 μm or more, for example, 200 μm or less, and particularly 40 μm or less.

When the MXene particles are laminate (multilayer MXene) particles, an interlayer distance (alternatively, a void dimension, indicated by Δd in FIG. 2(b)) inside each of the laminate particles is not particularly limited, and is, for example, 0.8 nm or more and less than 10 nm (that is, 8 Å or more and less than 100 Å), particularly 0.8 nm to 5 nm, and more particularly about 1 nm, and the maximum dimension (which may correspond to the "in-plane dimension" of the particles) in a plane (two-dimensional sheet plane) perpendicular to the lamination direction is, for example, 0.1 μm or more, particularly 1 μm or more, for example, 100 μm or less, and particularly 20 μm or less.

The total number of layers in the MXene particles may be 1 or 2 or more, but is, for example, 1 to 20, and the thickness in the lamination direction (which may correspond to the "thickness" of the particles) is, for example, 0.8 nm to 20 nm.

In a case where the MXene particles are laminate (multilayer MXene) particles, it is preferable that MXene has a small number of layers. The term "small number of layers" means, for example, that the number of stacked layers of MXene is 6 or less. In addition, the thickness of the multilayer MXene having a small number of layers in the lamination direction may be less than 10 nm. In the present specification, the "multilayer MXene having a small number of layers" is also referred to as a "few-layer MXene".

Although the present embodiment is not limited, the MXene particles may be particles (also referred to as nanosheets) in which most of the MXene particles are formed of single-layer MXene and/or few-layer MXene. In the present specification, the single-layer MXene and the few-layer MXene may be collectively referred to as "single-layer/few-layer MXene".

It should be noted that these dimensions described above may be determined as number average dimensions (for example, number average of at least 40) based on photographs of a scanning electron microscope (SEM), a transmission electron microscope (TEM), or an atomic force microscope (AFM), or as distances in the real space calculated from the positions on the reciprocal lattice space of the (002) plane measured by an X-ray diffraction (XRD) method.

<Amphoteric Polymer>

Separately, an amphoteric polymer is prepared. In the present disclosure, the "amphoteric polymer" is a polymer (polymer) having an anionic functional group and a cationic functional group. The polymer may be formed of one or more kinds of monomer units. The monomer unit means a constituent unit derived from a monomer that is a raw material of a polymer. The anionic functional group and the cationic functional group may be present in the same monomer unit or in separate monomer units.

The anionic functional group means a moiety that is anionic (negatively charged) in a liquid medium. The anionic functional group may be, for example, at least one selected from the group consisting of a carboxylic acid group, a carboxylic acid base, a sulfonic acid group, a sulfonic acid base, a phosphoric acid group, and a phosphoric acid base (which may be any part thereof). One or more anionic functional groups may be present in the amphoteric polymer.

The cationic functional group means a moiety that is cationic (positively charged) in a liquid medium. The cationic functional group may be, for example, at least one selected from the group consisting of amine, phosphonium, and a salt thereof (which may be any part thereof), and more specifically, may be at least one selected from the group consisting of primary amine, secondary amine, tertiary amine, an acid salt thereof, and a quaternary ammonium salt, and primary phosphonium, secondary phosphonium, tertiary phosphonium, an acid salt thereof, and a quaternary phosphonium salt. One or more kinds of cationic functional groups may be present in the amphoteric polymer.

For example, the amphoteric polymer may contain a first monomer unit having an anionic functional group and a cationic functional group. In other words, an anionic functional group and a cationic functional group may be present in the first monomer unit.

Typically, the first monomer unit may have a phosphorylcholine group. The phosphorylcholine group is represented by —OP(=O)(—O$^-$)OCH$_2$CH$_2$N$^+$(—CH$_3$)(—CH$_3$) CH$_3$, and is formed by bonding a moiety (—OP(=O)(—O$^-$)O—) functioning as an anionic functional group and a moiety (—CH$_2$CH$_2$N$^+$(—CH$_3$)(—CH$_3$) CH$_3$) functioning as a cationic functional group, and thus can be understood as an amphoteric functional group.

The amphoteric polymer may further contain a second monomer unit having a second anionic functional group in addition to the first monomer unit.

Alternatively, the amphoteric polymer may contain a third monomer unit having an anionic functional group and a fourth monomer unit having a cationic functional group. In other words, the anionic functional group may be present and the cationic functional group may not be present in the third monomer unit, and the cationic functional group may be present and the anionic functional group may not be present in the fourth monomer unit.

In any case, the bond between the monomer units constituting the amphoteric polymer is not particularly limited, and may be any appropriate bond. For example, the amphoteric polymer may be an acrylic polymer. The acrylic polymer means a polymer containing a monomer unit derived from a (meth)acryloyl group as a main component. "(Meth)acryloyl group" means an acryloyl group and/or a methacryloyl group. The main component means a component that accounts for 50% by mass or more of the polymer. The monomer unit derived from the (meth)acryloyl group can be represented by, for example, the formula: —CH$_2$—C(—R$^1$)(—COOR$^2$)— (wherein R$^1$ is a hydrogen atom or a methyl group, and R$^2$ may be an organic group having an anionic functional group and/or a cationic functional group, optionally a metal cation, a nonionic organic group, or the like).

Examples of commercially available resin materials containing an amphoteric polymer include Lipidure (registered trademark) series (manufactured by NOF CORPORATION). For example, Lipidure (registered trademark)-HM contains a homopolymer of a first monomer unit having a phosphorylcholine group as a polymer component, and Lipidure (registered trademark)-A contains a copolymer of a first monomer unit having a phosphorylcholine group, a second monomer unit having a carboxylate group, and a nonionic other monomer unit as a polymer component.

Commercially available resin materials may include amphoteric polymers as well as any suitable additives. Examples of the additive include, but are not limited to, a liquid medium, a surfactant, a curing agent and/or a cross-linking agent, a viscosity modifier (for example, a thickener), and the like.

<Liquid Composition>

A liquid composition containing the MXene particles and the amphoteric polymer respectively prepared above in a liquid medium is prepared.

The liquid medium may be either an aqueous medium or an organic medium, but an aqueous medium is preferable. The aqueous medium is typically water, and in some cases, other liquid substances may be contained in a relatively small amount (for example, 30% by mass or less, preferably 20% by mass or less based on the whole mass of aqueous medium) in addition to water. The organic medium is not particularly limited, and may be, for example, a protic solvent represented by an alcohol, an aprotic solvent, or the like, or may be a mixed solvent of two or more thereof.

In the obtained liquid composition, the MXene particles can be well dispersed in a liquid medium by the amphoteric polymer. As described later, by using a liquid composition having improved dispersibility of MXene particles, high strength and low impedance can be achieved in a finally obtained film.

The ratio of the amphoteric polymer to the total of the MXene particles and the amphoteric polymer in the liquid composition is 5 vol % to 70 vol %, and in such a range, the effect of high strength and low impedance can be exhibited. The ratio in the liquid composition is considered to be substantially the same as the ratio of the amphoteric polymer 11 to the total of the MXene particles 10 and the amphoteric polymer 11 in the finally obtained film 20.

The liquid composition may be in the form of a slurry, a paste, or the like depending on the total solid content concentration containing the MXene particles and the amphoteric polymer.

Step (b)

<Precursor Film>

Then, a precursor film is formed on a substrate using the liquid composition prepared above, and at least the precursor film is dried to obtain a film (more specifically, a conductive film).

The substrate is not particularly limited, and may be formed of any suitable material and have any suitable structure and/or form. In the surface of the substrate, a region where the precursor film is formed may or may not be flat, and may have a surface shape such as a curved surface shape, an uneven shape, or an irregular shape. The substrate may be typically, but not limited to, a substrate, a film, or the like. The material of the substrate is not particularly limited. The substrate may be formed of a conductive material. Examples of the conductive material include at least one material of metal materials such as gold, silver, copper, platinum, nickel, titanium, tin, iron, zinc, magnesium, aluminum, tungsten, and molybdenum, and a conductive polymer. The substrate may include a film (conductive film), such as a metal film, different from the film according to the present embodiment on a contact surface with the conductive film according to the present embodiment.

Alternatively, the substrate may be formed of an organic material. Examples of the organic material include flexible organic materials, such as a thermoplastic polyurethane elastomer (TPU), a PET film, a polyimide film, and a liquid crystal polymer film.

In a case where higher adhesion between the finally formed film and the substrate is required, the substrate surface (the surface on which the precursor film is formed) preferably has a functional group (for example, an OH group or the like) capable of hydrogen bonding with the MXene particles. Such a functional group may be originally possessed by the substrate, or may be developed by performing pretreatment (for example, plasma treatment). The pretreatment may be performed for the purpose of washing, hydrophilization, or the like.

However, the film of the present embodiment may be in the form of a free-standing film finally separated from the substrate. In this case, adhesion between the film and the substrate is unnecessary.

The method for forming the precursor film on the substrate is not particularly limited, but for example, the precursor film may be formed by spraying a liquid composition on the substrate. However, the precursor film may be formed on the porous member by a method other than spraying, for example, by using a porous member (for example, a membrane filter) as a substrate and passing (filtering) the liquid composition to the porous member. The spray can orient and arrange the MXene particles on the substrate (the MXene particles are aligned so that the two-dimensional sheet surfaces of the MXene particles are substantially parallel to the surface of the substrate (for example, within ±20°)), and the final resulting film is made denser than the filtration film, thereby obtaining higher environmental resistance (moisture resistance). In addition, any method such as bar coating, spin coating, or immersion can be applied.

Drying the precursor film removes unnecessary liquid media (the entire liquid medium is not necessarily removed, and a part of the liquid medium may remain) to form a film. The spraying and drying may be repeated to obtain a film of a desired thickness.

<Film>

Since the film obtained as described above is prepared using a liquid composition in which the dispersibility of MXene particles is improved by the amphoteric polymer, it is possible to realize both high strength and low impedance. Since the film of the present embodiment has high strength, a free-standing film can be easily obtained by removing the substrate if desired.

Although the present disclosure is not bound by any theory, the reason why a liquid composition having good dispersibility of the MXene particles can be obtained by the amphoteric polymer, the strength of the finally obtained film can be improved, and the impedance can be reduced is considered as follows.

The MXene particles have modifiers or terminals T (T is at least one selected from the group consisting of a hydroxyl group, a fluorine atom, a chlorine atom, an oxygen atom, and a hydrogen atom) on the surface of the layer body represented by $M_mX_n$, and a charged site in such a configuration exists. The two-dimensional sheet surface (plane parallel to the layer of MXene particles) that occupies most of the surface of the MXene particles is usually negatively charged. When the MXene particles are mixed with a liquid medium (typically, water), the MXene particles can be dispersed in the liquid medium by repulsion of negative charges, but some of the MXene particles can be attracted to each other by intermolecular force or hydrogen bonding force to aggregate. Therefore, a film produced using a liquid composition obtained by mixing the MXene particles alone in a liquid medium has low strength. In order to uniformly mix the MXene particles and the polymer in the liquid medium, it is conceivable to use a polymer having high affinity for the MXene particles and polarity instead of a polymer having poor polarity. However, for example, although polyurethane (refer to Patent Document 1) has high polarity, the MXene particles can aggregate in the liquid composition in which the MXene particles and polyurethane are mixed in the liquid medium, and it is difficult to obtain a film having high strength and low impedance.

In the present embodiment, in addition to the MXene particles and the liquid medium, an amphoteric polymer (polymer having an anionic functional group and a cationic functional group) is used in a predetermined ratio. By using the amphoteric polymer, a dispersion mechanism by electrostatic repulsion is favorably exhibited, and a favorable dispersion state can be maintained while the MXene particles and the amphoteric polymer are mixed with each other in the liquid medium. More specifically, it is considered that while a moiety of the cationic functional group of the amphoteric polymer adsorbs the negatively charged MXene particles, the moieties of the anionic functional group of the amphoteric polymer electrostatically repel each other, such adsorption and electrostatic repulsion are suitably balanced, aggregation of the MXene particles is effectively prevented by steric hindrance of the amphoteric polymer, and the MXene particles can be well dispersed. In the film produced using the liquid composition in which the MXene particles and the amphoteric polymer are mixed in the liquid medium at a predetermined ratio, the MXene particles are well dispersed in the amphoteric polymer, so that both high strength and low impedance can be achieved.

In the finally obtained film 20, the ratio of the amphoteric polymer 11 to the total of the MXene particles 10 and the amphoteric polymer 11 is 5 vol % to 70 vol %, similarly to the ratio in the liquid composition to be used, and in such a range, the effect of high strength and low impedance can be exhibited.

The strength of the film can be determined, for example, by the presence or absence of cohesive failure. The film made of the MXene simple substance material is easily cohesively peeled off by tape peeling (conforming to the cross-cut method defined in JIS K5600-5-6:1999). On the other hand, since the film of the present embodiment contains the MXene particles and the amphoteric polymer in a predetermined ratio, it is possible to prevent cohesive peeling and to obtain high film strength.

It can be determined that the impedance is low if the impedance is equal to or less than that of a film (for example, Reference Example 1 to be described later) made of a MXene simple substance material although the film is made of a composite material containing MXene particles and a polymer. According to the measurement conditions shown in Examples described later, for example, it is preferably 340 Ohm or less, and more preferably 330 Ohm or less at 10 Hz.

The ratio between the anionic functional group and the cationic functional group in the amphoteric polymer 11 is not particularly limited. In one example, the amphoteric polymer 11 as a whole is not too cationic and is preferably neutral or anionic. In one example, the amphoteric polymer 11 is preferably hydrophilic as a whole.

The film 20 of the present embodiment is a conductive film, and can be used for any suitable application. For example, the material may be used in applications requiring electrical conductivity, such as electrodes in any suitable electrical device or electromagnetic shields (EMI shields).

The electrode is not particularly limited, and may be, for example, a biosignal sensing electrode, a capacitor electrode, a battery electrode, a sensor electrode, an antenna electrode, an electrical stimulation electrode or the like. The film of the present embodiment is capable of providing a biosignal sensing electrode having low impedance and high sensitivity, a large-capacity capacitor and battery, and high sensitive sensor and an antenna even with a smaller volume (device occupied volume).

The biosignal sensing electrode is an electrode for sensing (acquiring) a biological signal. The biosignal sensing electrode may be, for example, but not limited to, an electrode for measuring electroencephalogram (EEG), electrocardiogram (ECG), electromyogram (EMG), and electrical impedance tomography (EIT).

The capacitor may be an electrochemical capacitor. The electrochemical capacitor is a capacitor using capacitance developed due to a physicochemical reaction between an electrode (electrode active material) and ions (electrolyte ions) in an electrolytic solution, and can be used as a device (power storage device) that stores electric energy. The battery may be a repeatedly chargeable and dischargeable chemical battery. The battery may be, for example, but not limited to, a lithium ion battery, a magnesium ion battery, a lithium sulfur battery, a sodium ion battery, or the like.

The sensor electrode is an electrode for detecting a target substance, state, abnormality, or the like. The sensor may be, for example, but not limited to, a gas sensor, a biosensor (a chemical sensor utilizing a molecular recognition mechanism of biological origin), or the like. The antenna electrode is an electrode for emitting an electromagnetic wave into a space and/or receiving an electromagnetic wave in the space.

The electrical stimulation electrode is an electrode for applying an electrical stimulation to a living body. Such electrical stimulation can be applied to a living body, particularly a living tissue, for example, a spinal cord, a brain, a nerve tissue, a muscle tissue, or the like, but is not limited thereto.

By using the film of the present embodiment, an electromagnetic shield having a high shielding rate (EMI shielding property) can be obtained.

Although the film in one embodiment of the present disclosure has been described in detail above, the present disclosure can be modified in various ways. It should be noted that the film of the present disclosure may be produced by a method different from the producing method in the above-described embodiment.

EXAMPLES

Example 1

1. Preparation of Particles of Layered Material

The MXene particles were first obtained by sequentially performing the following steps described in detail below: (1) preparation of the precursor (MAX), (2) etching of the precursor, (3) washing after etching, (4) intercalation of Li, and (5) delamination.

(1) Preparation of Precursor (MAX)

TiC powder, Ti powder, and Al powder (all manufactured by Kojundo Chemical Laboratory Co., Ltd.) were placed in a ball mill containing zirconia balls at a molar ratio of 2:1:1 and mixed for 24 hours. The obtained mixed powder was calcined in an Ar atmosphere at 1350° C. for 2 hours. A calcined body (block-shaped MAX) thus obtained was pulverized with an end mill to a maximum dimension of 40 μm or less. In this way, $Ti_3AlC_2$ particles were obtained as a precursor (powdery MAX).

(2) Etching Precursor (MAX)

Using the $Ti_3AlC_2$ particles (powder) prepared by the above method, etching was performed under the following etching conditions to obtain a solid-liquid mixture (slurry) containing a solid component derived from the $Ti_3AlC_2$ powder.

(Etching Conditions)
Precursor: $Ti_3AlC_2$ (sieving with a mesh size of 45 μm)
Etching solution composition: 49% HF 6 mL,
 $H_2O$ 18 mL
 HCl (12M) 36 mL
Amount of precursor input: 3.0 g
Etching container: 100 mL Aiboy
Etching temperature: 35° C.
Etching time: 24 h
Stirrer rotation speed: 400 rpm (3) Washing after Etching The slurry was equally divided into two portions and inserted into two 50 mL centrifuge tubes. Thereafter, the mixture was centrifuged at 3500 G for 5 minutes using a centrifuge, and then the supernatant was discarded. Thereafter, (i) 35 mL of pure water was added to the remaining precipitate in each centrifuge tube, (ii) stirring was performed by handshake, (iii) centrifugation was performed at 3500 G for 5 minutes, and (iv) the supernatant was removed. The steps (i) to (iv) were repeated 10 times. Finally, centrifugation was performed at 3500 G for 5 minutes to obtain a $Ti_3C_2T_s$-moisture medium clay.

(4) Li Intercalation

The $Ti_3C_2T_s$-moisture medium clay prepared by the above method was stirred at 20° C. or higher and 25° C. or lower for 12 hours using LiCl as a Li-containing compound according to the following conditions of Li intercalation to perform Li intercalation. The detailed conditions of Li intercalation are as follows.

(Conditions of Li Intercalation)
$Ti_3C_2T_s$-moisture medium clay (MXene after washing): Solid content: 0.75 g
LiCl: 0.75 g
Intercalation container: 100 mL Aiboy
Temperature: 20° C. or higher and 25° C. or lower (room temperature)
Time: 12 h
Stirrer rotation speed: 800 rpm (5) Delamination and Washing with Water The slurry obtained by Li intercalation was charged into a 50 mL centrifuge tube, centrifuged under the condition of 3500 G using a centrifuge, and then the supernatant was discarded. Next, (i) 40 mL of pure water was added to the remaining precipitate, and the mixture was stirred for 15 minutes with a shaker, then (ii) centrifuged at 3500 G, and (iii) the supernatant was recovered as a single-layer/few-layer MXene-containing liquid. The operations (i) to (iii) were repeated 4 times in total to obtain a single-layer/few-layer MXene-containing supernatant. Further, this supernatant was centrifuged under the conditions of 4300 G and 2 hours using a centrifuge, and then the supernatant was discarded to obtain a single-layer/few-layer MXene-containing MXene clay as a remaining precipitate.

2A. Preparation of Slurry of MXene Simple Substance Material (Reference Example 1)

The MXene clay obtained in the above 1 was taken in a predetermined amount of 50 mL centrifuge tube, and pure water was added thereto. At this time, the amount of pure water added was adjusted so that the concentration of MXene in the mixture was 1.5% by mass. Thereafter, the mixture was stirred on a shaker for 15 minutes to obtain a MXene slurry as a liquid composition.

2B. Preparation of Slurry of Mxene/Polymer Composite Material (Examples 1 to 5 and Comparative Examples 1 to 4)

The MXene clay obtained in the above 1 was taken in a predetermined amount of 50 mL centrifuge tube, subsequently any one of the polymer dispersions P1 to P3 and the polymers P4 to P5 in Table 1 was added according to the display in the column of "Polymer/Polymer dispersion" in Table 2 for Examples 1 to 5 and Comparative Examples 1 to 4, and pure water was appropriately added. At this time, the amounts of P1 to P5 and pure water added were adjusted so that the concentration of MXene in the mixture was 1.5% by mass, and the ratio of the polymer to the total of MXene (MXene particles) and the polymer in the dry film was the value of the "polymer ratio" shown in Table 2. Thereafter, the mixture was stirred on a shaker for 15 minutes to obtain a slurry of a MXene/polymer composite material as a liquid composition.

TABLE 1

| Trade name (source and the like) | Structure/Chemical Formula of Polymer |
|---|---|
| P1 (polymer dispersion) | Lipidure (registered trademark)-A (polymer concentration 5%, ingredients: polyquaternium-65, water, phenoxyethanol, manufactured by NOF CORPORATION) | Polyquaternium-65 |
| P2 (polymer dispersion) | Lipidure (registered trademark)-HM (polymer concentration 40%, ingredients: polymethacryloyloxyethyl phosphorylcholine, water, 1,3-butylene glycol (BG), methylparaben, manufactured by NOF CORPORATION) | Polymethacryloyloxyethyl phosphorylcholine |
| P3 (polymer dispersion) | CHEMIPEARL (registered trademark) S-100 (polyolefin aqueous dispersion, solid content 27%, manufactured by Mitsui Chemicals, Inc.) | Polyethylene-methacrylic acid copolymer (m/(m + n) = 5%) Ionomer resin |
| P4 (polymer) | Paraffin (melting point: 58° C. to 60° C.), product number: 167-13335 (manufactured by FUJIFILM Wako Pure Chemical Corporation) | $C_nH_{2n+2}$ Paraffin |
| P5 (polymer) | GOHSENX (registered trademark) K-434 (Cationic polyvinyl alcohol, manufactured by Mitsubishi Chemical Corporation) | Cationic PVOH (chemical structure image diagram) |

TABLE 2

| | Polymer/ polymer dispersion | Polymer ratio (% by volume) | Evaluation of strength (tape peeling test) | Impedance at 10 Hz (Ohm) | Interlayer distance $d_{002}$ (Å) |
|---|---|---|---|---|---|
| Reference Example 1 | None | 0 | 5 | 340 | 12.3 |
| Example 1 | P1 | 5 | 0 | 330 | 12.1 |
| Example 2 | P1 | 15 | 0 | 320 | 12.0 |
| Example 3 | P1 | 50 | 0 | 200 | 22.1 |
| Example 4 | P1 | 70 | 0 | 190 | 24.4 |
| Example 5 | P2 | 15 | 0 | 310 | 12.3 |
| Comparative Example 1 | P2 | 75 | 0 | 105 | 29.9 |
| Comparative Example 2 | P3 | 50 | 5 | — | 12.4 |
| Comparative Example 3 | P4 | 50 | 5 | — | 12.3 |
| Comparative Example 4 | P5 | 50 | 5 | — | 22.0 |

In Table 2, the symbol "-" indicates that evaluation was impossible because a free-standing film could not be prepared.

3. Preparation of Film Sample

Using the slurries obtained in the above 2A and 2B, film samples were prepared in the following order.

(a) The slurry was placed in a 25 ml syringe.
(b) The syringe of the above (a) was set in a spray coater.
(c) The polyimide substrate was set on a stage with suction of a spray coater.
(d) The atomization pressure was set to 0.5 MPa, the distance between the nozzle tip and the substrate was set to 15 cm, the liquid feeding amount was set to 5 mL/s, the sweep rate was set to 150 mm/s, and the stage heater was set to 45° C.
(e) A precursor film was formed by coating the substrate 15 times.
(f) Drying was performed under the conditions of 80° C. and 2 hours using an atmospheric oven, and further drying was performed under the conditions of 150° C. and 16 hours using a vacuum oven to obtain a sample of a film (dry film).

4. Evaluation of Samples (1) Impedance

As described above, measurement of the impedance was performed as follows.

(a) A free-standing film was obtained by removing the polyimide substrate from the film sample prepared on the above 3, and a beaker cell was assembled using the free-standing film as a working electrode, a platinum electrode as a counter electrode, and a silver/silver chloride electrode as a reference electrode. The size of the working electrode was 1.5 mm in diameter, and the size of the counter electrode was larger than the size of the working electrode.
(b) As measurement conditions, in a frequency range of 0.1 Hz to $10^5$ Hz, a voltage was set to 10 mVrms with respect to an open circuit voltage, the number of plots was set to 61 points, and the number of N per plot was set to 1 to 10, and measurement was performed in a potentiostat mode. As an apparatus, a VMP-300 high-performance electrochemical measurement system (16 ch advanced model) manufactured by Bio-Logic Science Instruments was used. As a measurement result, the impedance at 10 Hz is shown in Table 2.

(2) Strength (Tape Peeling Test)

The strength (bonding strength) of the film sample prepared on the polyimide substrate in the above 3 was evaluated in accordance with the cross-cut method defined in JIS K5600-5-6:1999. The evaluation results are classified as follows. The results are shown in Table 2.
- 0: Edges of cut are perfectly smooth and there is no peeling in any grid.
- 1: Small peeling of coating at intersection of cuts. Cross-cut portion is not clearly affected more than 5%.
- 2: Coating has peeled off along edges of cuts and/or at intersections. Cross-cut portion is clearly affected by more than 5% but not more than 15%.
- 3: Coating has largely peeled off partially or entirely along edges of cuts, and/or various parts of the grid are peeled off partially or entirely. Cross-cut portion is clearly affected by more than 15% but not more than 35%.
- 4: Coating has largely peeled off partially or entirely along edges of cuts, and/or several grids are peeled off partially or entirely. Cross-cut portion is not clearly affected more than 65%.
- 5: Any one of cases where classification cannot be performed even in classification 4.

(3) Interlayer Distance ($d_{002}$)

The interlayer distance ($d_{002}$) was measured as follows.
(a) The film sample prepared on the polyimide substrate in the above 3 was cut into a 2 cm square, and subjected to XRD measurement (characteristic X-ray: CuKα 1.541 Å) using an X-ray diffractometer (SmartLab3 and SmartLab Studio II software manufactured by Rigaku Corporation) to obtain an XRD profile of θ-axis direction scan in the range of 2θ=2 degrees to 50 degrees. The step was 0.02 degrees and the scan speed was 5 degrees/min.
(b) Since a peak corresponding to the (002) plane of MXene ($Ti_3C_2T_8$) appears near 2θ=7 degrees, θ, n=1, and λ=1.541 Å (wavelength of CuKα ray) of the peak were applied to Bragg's equation (2d sin θ=nλ) to obtain the interplanar spacing $d_{002}$ value of the (002) plane as the interlayer distance. The results are shown in Table 2.

With reference to Table 2, in Examples 1 to 5 related to the film sample obtained by mixing the MXene particles with the amphoteric polymer at a polymer ratio of 5 to 70 vol %, lower impedance than that of Reference Example 1 related to the film sample containing only MXene particles (no polymer) was obtained, and high film strength was exhibited. On the other hand, in Comparative Example 1 related to the film sample obtained by mixing the MXene particles with the amphoteric polymer at a polymer ratio of 75 vol %, although the film strength was high, the impedance was significantly higher than that of Reference Example 1. It is understood that the higher the polymer ratio in the film, the larger the interlayer distance $d_{002}$ of MXene.

It is considered that when the polymer ratio in the film exceeds 70 vol %, for example, 75 vol %, the interlayer distance $d_{002}$ of MXene increases beyond a certain threshold value, the conductivity of the film is significantly reduced, and the impedance becomes too high. In Comparative Example 2 in which an ionomer of a polyethylene-methacrylic acid copolymer was used, Comparative Example 3 in which hydrophobic paraffin was used, and Comparative Example 4 in which cationic PVOH having no anionic functional group was used, the dispersibility of the MXene particles and the polymer in the slurry was poor as compared with Examples 1 to 5 and Comparative Example 1 in which an amphoteric polymer was used, the MXene particles and the polymer were not well mixed (separated) in the obtained film (dry film), the strength was low (easy aggregation and peeling was performed), and a free-standing film could not be obtained.

The film of the present disclosure can be used for any appropriate application, and can be preferably used as, for example, a biosignal sensing electrode or the like.

<1> A film comprising: particles of a two-dimensional material containing one or plural layers, wherein the one or plural layers comprise a layer body represented by:

$M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from a hydroxyl group, a fluorine atom, a chlorine atom, an oxygen atom, and a hydrogen atom; and a polymer having an anionic functional group and a cationic functional group, wherein a ratio of the polymer to a sum of the particles of the two-dimensional material and the polymer in the film is 5 vol % to 70 vol %.

<2> The film according to <1>, wherein the polymer comprises a first monomer unit having the anionic functional group and the cationic functional group.

<3> The film according to <2>, wherein the first monomer unit has a phosphorylcholine group.

<4> The film according to <2> or <3>, wherein the polymer further comprises a second monomer unit having a second anionic functional group.

<5> The film according to any one of <1> to <4>, wherein the polymer comprises a third monomer unit having the anionic functional group and a fourth monomer unit having the cationic functional group.

<6> An electrode comprising the film according to any of <1> to <5>.

<7> The electrode according to <6>, which is a biosignal sensing electrode.

<8> The electrode according to <6>, which is an electrical stimulation electrode.

REFERENCE SIGNS LIST 1a, 1b Layer body ($M_mX_n$ layer)
3a, 5a, 3b, 5b Modifier or terminal T
7a, 7b MXene layer
10, 10a, 10b MXene particles (particles of two-dimensional material)
11 Amphoteric polymer (polymer having anionic functional group and cationic functional group)
20 Film

The invention claimed is:

1. A film comprising:
   particles of a two-dimensional material containing one or plural layers, wherein the one or plural layers comprise a layer body represented by:
   $M_m X_n$
   wherein
   M is at least one metal of Group 3, 4, 5, 6, or 7,
   X is a carbon atom, a nitrogen atom, or a combination thereof,
   n is not less than 1 and not more than 4, and
   m is more than n but not more than 5, and
   a modifier or terminal T exists on a surface of the layer body, wherein T is at least one selected from a hydroxyl group, a fluorine atom, a chlorine atom, an oxygen atom, and a hydrogen atom; and
   an amphoteric polymer having an anionic functional group and a cationic functional group in one or more monomer units of the amphoteric polymer,
   wherein $M_m X_n$ comprises one or more selected from $Ti_2C$, $Ti_3C_2$, $Ti_3(CN)$, $(Cr_2Ti)C_2$, $(Mo_2Ti)C_2$, $(Mo_2Ti_2)C_3$, and $(Mo_{2.7}V_{1.3})C_3$, and
   wherein a ratio of the amphoteric polymer to a sum of the particles of the two-dimensional material and the amphoteric polymer in the film is 5 vol % to 70 vol %.

2. The film according to claim 1, wherein the anionic functional group and the cationic functional group are present in a same monomer unit.

3. The film according to claim 1, wherein the anionic functional group and the cationic functional group are present in separate monomer units.

4. The film according to claim 1, wherein the anionic functional group is at least one selected from a carboxylic acid group, a carboxylic acid base, a sulfonic acid group, a sulfonic acid base, a phosphoric acid group, and a phosphoric acid base.

5. The film according to claim 1, wherein the cationic functional group is at least one selected from an amine, a phosphonium, and a salt thereof.

6. The film according to claim 1, wherein the cationic functional group is at least one selected from a primary amine, a secondary amine, a tertiary amine, an acid salt thereof, and a quaternary ammonium salt, and a primary phosphonium, a secondary phosphonium, a tertiary phosphonium, an acid salt thereof, and a quaternary phosphonium salt.

7. The film according to claim 1, wherein the polymer comprises a first monomer unit having the anionic functional group and the cationic functional group.

8. The film according to claim 7, wherein the first monomer unit has a phosphorylcholine group.

9. The film according to claim 7, wherein the anionic functional group is a first anionic functional group, and the polymer further comprises a second monomer unit having a second anionic functional group.

10. The film according to claim 1, wherein the one ore more monomer units of the amphoteric polymer comprise a first monomer unit having the anionic functional group and a second monomer unit having the cationic functional group.

11. The film according to claim 1, wherein the amphoteric polymer is an acrylic polymer.

12. The film according to claim 1, wherein the amphoteric polymer is hydrophilic.

13. The film according to claim 1, wherein the two-dimensional material contains the plural layers, and an interlayer distance between adjacent layers of the plural layers is 12.0 to 24.4 Å.

14. The film according to claim 1, wherein an impedance of the film at 10 Hz is 330 Ω or less.

15. An electrode comprising the film according to claim 1.

16. The electrode according to claim 15, wherein the electrode is constructed as a biosignal sensing electrode.

17. The electrode according to claim 15, wherein the electrode is constructed as an electrical stimulation electrode.

* * * * *